United States Patent Office 3,817,851
Patented June 18, 1974

3,817,851
RADIATION CROSS-LINKING OLEFIN POLYMERS IN COMBINATION WITH TRIVINYL ISOCYANURATE
George J. Atchison and Donald J. Sundquist, Midland, Mich., assignors to The Dow Chemical Company, Midland, Mich.
No Drawing. Filed Oct. 2, 1972, Ser. No. 293,786
Int. Cl. B01j 1/10, 1/12
U.S. Cl. 204—159.17                6 Claims

ABSTRACT OF THE DISCLOSURE

A cross-linked olefin polymer is produced by applying high energy ionizing radiation to a mixture of the olefin polymer and trivinyl isocyanurate in an amount such that the mixture absorbs a radiation dose of between about 0.1 and about 1 megarad. The trivinyl isocyanurate serves to enhance the cross-linkability of the olefin polymer such a high degree of cross-link is achieved with a small radiation dose. The mixture can also contain a foaming agent which can be made to expand and thereby produce a cellular product. Products fashioned of the cross-linked polymer have improved dimensional stability and are more resistant to thermal shrinkage and distortion. The cross-linked olefin polymer can be fashioned into a variety of products having utility in many fields including the packaging and construction industries.

---

This invention relates to methods for producing cross-linked olefin polymers. In one aspect, this invention relates to methods for cross-linking an olefin polymer by means of high energy ionizing radiation wherein a cross-link promoter is employed to enhance the cross-linking reaction. In another aspect, this invention relates to methods of producing cellular products of a polyolefin which is cross-linked by high energy ionizing radiation in the presence of a polyfunctional monomer which enhances the cross-linking reaction.

Cross-linked olefin polymers exhibit better dimensional stability and higher tensile strength than the corresponding non-cross-linked polymer. These properties of the polymer are important in determining whether or not the polymer is suitable for use in a particular application. As a general rule, when the polymer is shaped into an article such as a film, sheet, fiber, tube, or coating on wire or the like it is desirable that the polymer have maximum dimensional stability, tensile strength, and resistance to thermal distortion.

The prior artis replete with techniques for producing cross-linked polymers. These techniques can be broadly classified into chemical cross-linking and radiation cross-linking. In the chemical cross-linking process, a cross-linking agent such as dicumyl peroxide is blended with the polymer and heat is applied to promote the cross-linking reaction. In the radiation cross-linking process, the polymer is irradiated with high energy ionizing radiation. While the mechanism of the interaction between the ionizing radiation and the polymer material is perhaps subject to speculation, the resulting transfer of energy to the polymer produces cross-linking between the individual polymer chains. The prior art also teaches that the cross-linking reaction can be enhanced in both processes by the use of a so-called sensitizer or cross-linking promoting agent. Cross-linking promoters which are recognized in the art for the purpose of enhancing the cross-linking reaction are normally polyfunctional monomers such as divinyl benzene, triethylene glycol diacrylate, diallyl maleate, and the like. While these polyfunctional monomers do in fact promote the cross-linking reaction in the sense that when they are used a given degree of cross-link can be achieved with less cross-linking agent or with a lower radiation dose, the cross-linking promoters suggested for use in cross-linking by ionizing radiation are not completely satisfactory in terms of enhancing the cross-linking reaction at low radiation doses.

According to this invention, these and other disadvantages of the prior art techniques for cross-linking an olefin polymer by high energy ionizing radiation are overcome by means of trivinyl isocyanurate to enhance the cross-linkability of the olefin polymer. It has been discovered that trivinyl isocyanaurate is surprisingly and unexpectedly more effective, as compared to closely related polyfunctional monomers, in enhancing the cross-linking reaction of an olefin polymer which is cross-linked by relatively low doses of high energy ionizing radiation.

Accordingly, it is an object of this invention to provide a method of cross-linking an olefin polymer by high energy ionizing radiation.

Another object of this invention is to provide an improved method of cross-linking olefin polymers with high energy ionizing radiation to produce improved cross-linked polymers with lower energy requirements.

A further object of this invention is to provide a method for increasing the efficiency of a method for cross-linking olefin polymers by high energy ionizing radiation.

Yet another object of the invention is to produce cellular products of an olefin polymer which is cross-linked by high energy ionizing radiation.

These and other objects of the invention will become apparent to one skilled in the art after studying the following detailed description and the appended claims.

According to the invention, a cross-linked olefin polymer is produced by the method which comprises applying high energy ionizing radiation to a mixture of the olefin polymer and trivinyl isocyanurate. The high energy ionizing radiation is applied in an amount such that the mixture absorbs a radiation dose of between about 0.1 and about 1 megarad. While the effect of using trivinyl isocyanurate to enhance the cross-linking reaction are realized throughout a rather broad radiation dose, the surprising and unexpected behavior of the trivinyl isocyanurate as a cross-linking promoter is more pronounced, as compared to closely related polyfunctional monomers, at a radiation dose of between about 0.1 and about 1 megarad.

The trivinyl isocyanurate is generally used in an amount sufficient to enhance the cross-linking reaction of the olefin polymer. For obvious economic reasons, it is usually desirable to not employ more of the trivinyl isocyanurate than is necessary to achieve the degree of cross-linking desired. The trivinyl isocyanurate can be present in the mixture with the olefin polymer in an amount up to about 10 weight percent based upon the weight of the mixture and preferably in an amount between about 0.1 and about 10 weight percent.

Olefin polymers which can be cross-linked by the method of the invention include those polymers prepared from a 1-olefin having between 2 and 8 carbon atoms per molecule. Exemplary olefin polymers include polyethylene, polyproylene, polybutene-1, and the like. The olefin polymer can also be a copolymer of a 1-olefin of the type described above and a copolymerizable monomer such as vinyl acetate, ethyl acrylate, and the like.

This method of the invention is particularly suited for producing a cellular product of a cross-linked olefin polymer. In this embodiment, the mixture of the olefin polymer and the trivinyl isocyanurate includes a foaming agent which will expand and produce a multitude of cells in the cross-linked olefin polymer product. The cellular product can be in the form of a film, sheet, fiber, tube, wire coating, or the like. Any suitable apparatus can be employed for producing the product desired. For example, when the product is a cross-linked cellular sheet, an extruder having a slot die can be used to form the mixture of olefin polymer, trivinyl isocyanurate, and foaming agent into a web. The web can then be subjected to high energy ionizing radiation to effect the cross-linking reaction. This is normally accomplished before expansion of the foaming agent. The foaming agent is then caused to expand and thereby transform the web into a cellular sheet.

A variety of different foaming or blowing agents can be employed in this embodiment of the invention. The selection of a blowing agent will be dictated by its performance in a particular process. The so-called volatile type blowing agents, such as a halogenated fluorine-containing hydrocarbon, can be used to produce a cellular product in conjunction with an extrusion process. The so-called decomposable blowing agents, such as azodicarbonamide, can also be employed to produce the cellular product. The volatile blowing agent is normally introduced into the extruder after the olefin polymer has been plastified. The decomposable blowing agent is usually preblended with the olefin polymer and the trivinyl isocyanurate prior to being introduced into a plastifying apparatus. The use of a decomposable foaming agent has the advantage of allowing better control of the foaming step. Thus, for example, when the product is in the form of a cellular sheet produced by an extruder as described above, the web can be formed and the olefin polymer cross-linked at a temperature below the decomposition temperature of the foaming agent. Heat as is necessary to decompose the foaming agent can then later be applied to the web to produce the cellular sheet. The same technique can be employed for producing products other than sheets.

Exemplary decomposable foaming agents which can be employed in the practice of the invention include azodicarbonamide, ammonium carbonate, azobisisobutyronitrile, hydrazodicarbonamide, and the like. Exemplary volatile foaming agents which can be employed include dichlorodifluoromethane, dichlorotetrafluoroethane, monochlorodifluoromethane, perfluorocyclobutane, and the like. The amount of foaming agent which is employed will depend upon such factors as the density desired in the cellular product, the size and shape of the cellular product, the type of olefin polymer, and the like. In general, the foaming agent is present in an amount between about 0.1 and about 20 weight percent based upon the total weight of the mixture including the foaming agent, the olefin polymer, and the trivinyl isocyanurate.

The products according to the invention can also contain coloring agents, stabilizers, fillers, and the like. In addition, the cellular products produced by the invention can contain nucleating agents, cell size control agents, and the like.

The trivinyl isocyanurate can be prepared by reacting cyanuric acid with acetylene at a temperature of between about 150° and about 225° C. in an inert solvent and in the presence of a zinc or cadmium catalyst. U.S. Pat. 3,480,627 is illustrative of one technique for preparing trivinyl isocyanurate.

The high energy ionizing radiation which is employed for effecting the cross-linking reaction can be obtained from any suitable source such as an atomic pile, a resonant transformer accelerator a Van de Graaff electron accelerator, a Linac electron accelerator, a betatron, a synchrotron, a cyclotron, or the like. Radiation from these sources will produce ionizing radiation such as electrons, protons, neutrons, deuterons, gamma rays, X-rays, alpha particles, and beta particles.

The cross-linking reaction is conveniently effected at room temperature, but it can be conducted at depressed or elevated temperatures as desired. It is also within the spirit and scope of the invention to effect the cross-linking reaction within the confines of an inert atmosphere to prevent oxidation of the olefin polymer.

The following examples are illustrative embodiments of the method of the invention.

EXAMPLE I

Low density polyethylene in powder form and having a melt index of about 0.2 as determined by ASTM test procedure D 1238–57T was blended with trivinyl isocyanurate in a ball mill jar until a uniform mixture was obtained. The resulting blend was then formed into discs each having a thickness of about one-eighth inch and a diameter of about 2 inches by molding at a temperature of about 130° C. between heated platens. Samples suitable for irradiation were then cut from the molded discs by means of an arbor press and a punch having a diameter of three-eighths inch. Control samples from the same lot of polyethylene were molded into discs by the technique described above without any trivinyl isocyanurate. Several other control samples were also prepared by the technique described above from the same lot of polyethylene and with each of diallyl fumarate, allyl methacrylate, triallyl cyanurate, and triallyl isocyanurate. The relative amounts of the polyethylene and the other ingredients are indicated in Table I below. The several three-eighths inch diameter samples were then subjected to high energy ionizing radiation with a scanned electron beam at a current of about 122 microamps at 2 million electron volts from a Van de Graaff accelerator using an aluminum filter of 0.19 grams per sq. cm. between the beam exit window and the sample. A conveyer was used to support and move the samples through the beam at a speed of about 3.4 cm. per second. A beam current of 122 microamps will produce a radiation dose of about 0.25 megarad with each pass through the beam. Multiple

TABLE I

| Run No. | Type of cross-link promoter | Amount of cross-link promoter (wt. percent) | Gel (wt. percent) at indicated radiation dose (megarads) | | | | | | | |
|---|---|---|---|---|---|---|---|---|---|---|
| | | | 0 | 0.2 | 0.25 | 0.4 | 0.5 | 0.6 | 0.75 | 0.8 | 1.0 |
| 1 | TVI | 2 | 0.2 | | 35.2 | | 39.5 | | 42.3 | | 49.9 |
| 2 | TVI | 5 | 0.0 | | 43.6 | | 57.6 | | 64.4 | | 63.2 |
| 3 | TVI | 10 | 0.0 | | | | | | | | 69.1 |
| C1 | None | | 0.0 | | 0.2 | | 0.6 | | 10.1 | | 15.1 |
| C2 | DAF | 2 | 0.2 | | | | | | | | 38.8 |
| C3 | DAF | 5 | 0.3 | | | | | | | | a 31.3 |
| C4 | DAF | 10 | 0.2 | | | | | | | | b 26.8 |
| C5 | AM | 2 | 0.2 | | 14.5 | | 24.4 | | 30.4 | | 31.8 |
| C6 | AM | 5 | 0.1 | | 13.8 | | 22.5 | | 30.0 | | 34.0 |
| C7 | AM | 10 | 0.1 | | | | | | | | 35.7 |
| C8 | TAC | 2 | 0.1 | | 0.1 | | 2.3 | | 1.6 | | 14.9 |
| C9 | TAC | 5 | 0.1 | | 0.1 | | 2.0 | | 3.5 | | a 6.4 |
| C10 | TAC | 10 | 0.3 | | | | | | | | b 6.6 |
| C11 | TAI | 5 | 0.4 | 7.6 | | 28.4 | | 37.3 | | 46.8 | 51.9 | a Average of two measurements.
b Average of three measurements.

NOTE.—TVI=Trivinyl isocyanurate; DAF=Diallyl fumarate; AM=Allyl methacrylate; TAC=Triallyl cyanurate; TAI=Triallyl isocyanurate. In Run No. C11 the beam current was 49 microamps thereby resulting in a radiation dose of 0.1 megrarad per pass through the beam.

passes were used in some instances to obtain the desired radiation dose. The radiation dose which each sample received is reported in Table I. After the samples had been irradiated, the gel fraction was determined by extraction with boiling toluene. The gel fraction of each sample, which indicates the degree of cross-link, is also reported in Table I.

II below sets forth the foam volume obtained with each sample. Run Nos. 5, 6, 7 and C4 were obtained with the blends which did not contain any zinc oxide.

TABLE II

| Run No. | Radiation dose (megarad) | Gel (wt. percent) | Foam volume (number of times expanded) at indicated foaming time (seconds) | | | | Maximum foam volume achieved at time indicated in parenthesis (seconds) |
|---|---|---|---|---|---|---|---|
| | | | 30 | 60 | 90 | 120 | |
| 1 | 0.1 | 29.2 | 7 | 60 | 82 | 81 | 82 (80) |
| 2 | 0.25 | 42.3 | 12 | 86 | 87 | 85 | 89 (70) |
| 3 | 0.5 | 37.3 | 7 | 75 | 88 | 87 | 89 (80) |
| 4 | 1.0 | 41.1 | 7 | 60 | 74 | 68 | 78 (70) |
| C1 | 0 | 2.9 | 4 | 10 | 8 | 8 | 12 (65) |
| C2 | 2.0 | 45.3 | 7 | 52 | 33 | 27 | 55 (55) |
| C3 | 3.0 | 48.3 | 9 | 34 | 20 | 15 | 47 (50) |
| 5 | 0.25 | ND | 0 | 18 | 85 | 79 | 86 (85) |
| 6 | 0.5 | ND | 0 | 15 | 74 | 71 | 75 (85) |
| 7 | 1.0 | ND | 0 | 30 | 73 | 68 | 74 (75) |
| C4 | 0 | ND | 0 | 5 | 5 | ND | 7 (75) |

NOTE.—ND=Not determined.

As indicated by the data reported in Table I, the trivinyl isocyanurate is very effective as a cross-link promoter (compare Runs 1–3 and C1). Moreover, as further illustrated by the data in Table I, the trivinyl isocyanurate is surprisingly and unexpectedly better as a cross-link promoter than diallyl fumarate (Runs 1–3 and C2–C4), allyl methacrylate (Runs 1–3 and C5–C7), triallyl cyanurate (Runs 1–3 and C8–C10), and triallyl isocyanurate (Runs 1–3 and C11), particularly with radiation doses near the lower end of the radiation dose range.

EXAMPLE II

In order to illustrate the suitability of the invention for producing cellular products, low density polyethylene of the type described in Example I was melt blended at a temperature of about 140° C. by means of a Brabender Plasticorder with azodicarbonamide foaming agent, trivinyl isocyanurate, and zinc oxide. The azodicarbonamide was present in the blend in an amount equal to about 15 weight percent based upon the weight of the polyethylene. The trivinyl isocyanurate was present in the blend in an amount equal to about 0.1 weight percent based upon the weight of the polyethylene. The zinc oxide, which was used to lower the decomposition temperature of the foaming agent, was present in the blend in an amount equal to about 5 weight percent based upon the weight of the polyethylene. Another blend was prepared with the materials in the proportions noted above except the zinc oxide was omitted. The resulting blends were then compression molded at a temperature of about 140° C. into sheets about one-eighth inch thick. Samples were cut from the sheets and irradiated by the technique described in Example I. In one control run the samples were not irradiated. In another series of controls, the samples were irradiated to provide absorbed radiation doses greater than 1 megarad. The gel fraction of several of the samples was then determined by extraction with Decalin at 130° C. The remainder of each sample was foamed by immersion in silicone oil at a temperature of 250° C. The foaming characteristics during foaming and the resistance to thermal collapse after foaming of each sample was determined by means of the foam volume recording apparatus described by L. C. Rubens in the Journal of Cellular Plastics, vol. 1, No. 2 (April 1965) page 314. This apparatus directly plots the volume of the foam against the time elapsed from immersion of the sample such that the number of times expansion is continuously recorded during the time the sample is in the silicone oil. Table When the foam volume data reported in Table II are plotted against foaming time, it will be seen that the method of the invention is very effective in producing a cellular product which is extremely resistant to thermal collapse. This is evidenced by the fact that the foam volume in Run Nos. 1 through 7 remains substantially constant after the maximum foam volume is achieved whereas the foam volume in Run Nos. C2 and C3, wherein the absorbed radiation dose is greater than 1, decreased appreciably at the same elevated temperature in a very short period of time. This indicates that cellular products produced by the method of the invention exhibit excellent resistance to thermal collapse. The data also show that the cellular products produced by the invention have a higher maximum foam volume (number of times expanded) as compared to the cellular products obtained with polyethylene which was not irradiated and as compared to the cellular products obtained with polyethylene which had an absorbed radiation dose greater than 1 megarad.

The instant invention is useful in producing cross-linked olefin polymers having improved dimensional stability and tensile strength, particularly at elevated temperatures, when compared to the corresponding non-cross-linked polymer. The invention can thus be employed to cross-link a variety of products fabricated or shaped from the olefin polymer. Illustrative useful products include fibers, films, tubes, sheets, coated wires, pipe, and the like.

Although the invention has been described in considerable detail, such description is for the purpose of illustration only and should not be construed as limiting of the invention.

What is claimed is:

1. A method of producing a cross-linked olefin polymer comprising applying high energy ionizing radiation to a mixture of said olefin polymer and trivinyl isocyanurate in an amount such that the mixture absorbs a radiation dose of between about 0.1 and about 1 megarad, said trivinyl isocyanurate being present in said mixture in an amount sufficient to enhance the cross-linking of said olefin polymer.

2. A method according to Claim 1 wherein said trivinyl isocyanurate is present in said mixture in an amount up to about 10 weight percent based upon the weight of said mixture.

3. A method according to Claim 1 wherein said olefin polymer is selected from the group consisting of polyethylene, polypropylene, and copolymers of a 1-olefin and a copolymerizable monomer.

4. A method according to Claim 1 wherein said mixture includes a foaming agent.

5. A method according to Claim 4 wherein said foaming agent is of a type which will decompose and evolve a gas by the application of heat.

6. A method according to Claim 5 which includes the step of applying heat to the resulting cross-linked olefin polymer to cause said foaming agent to decompose and thereby produce a cellular olefin polymer product.

References Cited

UNITED STATES PATENTS

| | | | |
|---|---|---|---|
| 3,480,627 | 11/1969 | Heinert | 260—248 NS |
| 3,717,559 | 2/1973 | Oyama et al. | 204—159.17 |
| 3,542,661 | 11/1970 | Klopfer et al. | 204—159.17 |

MURRAY TILLMAN, Primary Examiner

R. B. TURNER, Assistant Examiner

U.S. Cl. X.R.

260—2.5 HA, AW, 77.5 NC, 94.9 GA, 94.9 GD, 248 NS, 878